Nov. 7, 1939. H. A. DOUGLAS 2,179,252
ELECTRICAL CONTROL MEANS
Filed Oct. 12, 1936 5 Sheets-Sheet 1

Harry A. Douglas
INVENTOR

Nov. 7, 1939.    H. A. DOUGLAS    2,179,252
ELECTRICAL CONTROL MEANS
Filed Oct. 12, 1936    5 Sheets-Sheet 4

Harry A. Douglas
INVENTOR
BY Freeman, Snow, Albrecht and Wiedman
ATTORNEYS

Patented Nov. 7, 1939

2,179,252

UNITED STATES PATENT OFFICE 2,179,252

ELECTRICAL CONTROL MEANS

Harry A. Douglas, Bronson, Mich., assignor to Kingston Products Corporation, a corporation of Indiana Application October 12, 1936, Serial No. 105,189

6 Claims. (Cl. 200—6)

This invention relates to electrical control means, more particularly to the type of control means suitable for use with an automotive vehicle, and the principal object of this invention is to provide new and improved means of this character.

In the drawings accompanying this specification and forming a part of this application, I have shown, for purposes of illustration, several forms which my invention may assume, and in these drawings.

Figure 4:
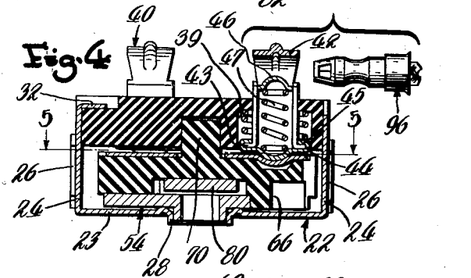
Figure 4 is a transverse sectional view corresponding substantially to the line 4—4 of Figure 1, and showing, in addition, a plug conductor terminal adapted to cooperate with one of the contact means carried by the switch base.
Figure 5:
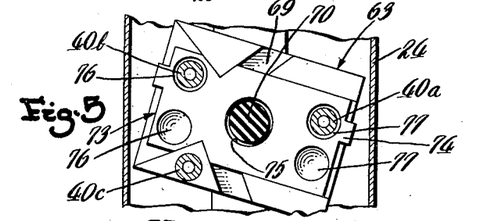
Figure 5 is a fragmentary sectional view corresponding substantially to the line 5—5 of Figure 4.
Figures 6, 7, 8:
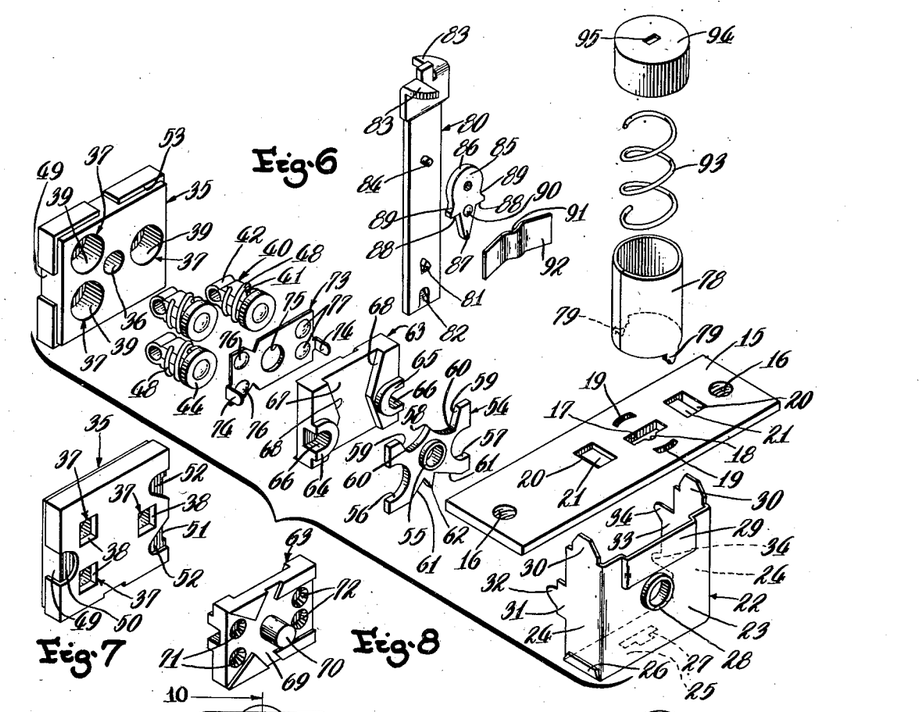
Figure 6 is a disassembled perspective view of the parts comprising the embodiment of the invention shown in Figures 1 through 5.
Figure 7 is a perspective view of the support shown in Figure 6, as viewed from the other side.
Figure 8 is a perspective view of the bridge carrying means shown in Figure 6, as viewed from the other side.

The embodiment of the invention shown in Figures 1 through 8, comprises an oblong generally plane plate 15, which is provided with apertures 16 at its longitudinal extremities, to provide for the attachment of the plate 15 to a suitable support, as for instance a part of an automotive vehicle. Formed on the longitudinal axis of the plate 15 is an elongated slot 17, one longitudinal margin of the slot 17 being provided with an arcuate recess 18, as best shown in Figure 6. Spaced from the longitudinal margins of the slot 17 are arcuate slots 19, and spaced from the transverse margins of the slot 17 are apertures 20, each of the apertures 20 communicating with a recessed well portion 21 formed in the upper surface of the plate 15.

A housing or casing 22 is adapted for securement to the plate 15, the housing 22, as shown in Figure 6, being preferably formed of a single piece of sheet metal and generally box shaped. The housing 22 is provided with a front wall 23, relatively narrow side walls 24 formed by bending inwardly extensions of the wall 23, and an end wall 25, the latter wall having extremities upwardly bent as shown at 26 to overlap an adjacent portion of the side walls 24. The end wall 25 is also formed with a generally T-shaped slot 27 for a purpose that will hereinafter appear. The front wall 23, substantially near its central portion, is provided with an extruded tubular part 28, and adjacent the upper extremity of the front wall 23 is an outwardly pressed rectangularly shaped chamber portion 29. Each of the upper extremities of the side walls 24 is provided with an extending ear 30. One of the free longitudinal margins of the side walls 24 is provided with a relatively narrow extension 31 which has a reduced tapered ear 32, and the other side wall 24 is provided with a wider extension 33 having two ears 34 integrally formed therewith.

Cooperable with the housing 22, and adapted to close off the open side of the housing opposite the front wall 23, is a supporting member 35, formed of suitable insulating material, and provided substantially at its central portion with a transversely extending circular recess 36. Disposed about the recess 36 are a plurality of apertures 37, here shown to be three in number. As viewed in Figures 6 and 7, one of the apertures 37 is disposed on one side of the longitudinal axis of the supporting member 35, and the other of the apertures 37 are spaced apart and are disposed on the opposite side of the longitudinal axis. Each of the apertures 37 is in part formed with rectangular outline, as shown at 38, and the remainder of each aperture 37 is formed as a circular well 39 countersinking the rectangular portion 38.

Fitting within each of the apertures 37 is a contact means 40, which is substantially similar to the contact means described in detail in my copending application, Serial Number 51,069, filed November 22, 1935, and a brief description here is believed to be sufficient. As best shown in Figures 4 and 6, each of the contact means 40 comprises a tubular body portion 41 preferably formed of sheet metal, having an integral loop 42 at one end, and outwardly extending flanges 43 at the other end, this latter end constituting the open end of the tubular body portion. The open end of the tubular body portion 41 is spanned by a generally circular contact head 44, the contact head having a peripheral flange adapted to be clinched over the flanges 43 of the body portion 41, as shown at 45. Before the contact head 44 is secured to the body portion 41, a detent means 46 and a spring 47 are inserted within the tubular body portion 41, the detent means 46 being slidable within the body portion and having a protuberance projecting into the aperture formed by the loop 42, and movement of the detent means 46 in the direction of the aperture being limited by abutment with shoulders formed on the body portion 41. The spring 47 is interposed between the detent means 46 and the inner adjacent surface of the contact head 4, the purpose of the spring 47 being to urge the detent means 46 toward operative position with respect to the aperture formed by the looped portion 42. It will be appreciated that the cross-sectional outline of the tubular body portion 41 closely fits the rectangular portion 38 of any one of the apertures 37. A spring 48 is slipped over the body portion 41, the spring 48 being of a size so that one end bears against the shoulder formed by the clinched over periphery of the contact head 44, and the opposite end bears against the bottom of the well portion 39, when the contact means 40 is assembled with the supporting member 35 as shown in Figure 4.

As best shown in Figures 6 and 7, one margin of the supporting member 35 is provided with a recess 49 which communicates with an undercut poriton 50 formed in the outer surface of the supporting member 35. The term "outer surface" is used to designate the surface of the supporting member which will be facing outwardly when the supporting member 35 is properly assembled with the housing 22, and it is the surface hidden in Figure 6, and seen in Figure 7. The opposite margin of the supporting member 35 is provided with a recess 51 somewhat greater in extent than the recess 49, the ends of the recess 51 communicating with two undercut portions 52 formed in the outer surface of the supporting member 35. The inner surface of the supporting member 35 is provided with a rabbet so as to form a shoulder 53 about the perimeter thereof, the size of the inner surface fitting closely within the open end of the housing 22, and the shoulder 53 being adapted to abut the margins defining the open end of the housing 22.

Figure 1:
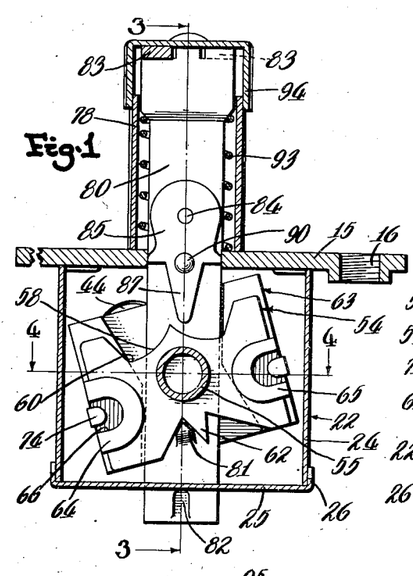
Figure 1 is a longitudinal sectional view of an embodiment of my invention, parts being broken away to better accommodate the view to the sheet.
Figure 2:
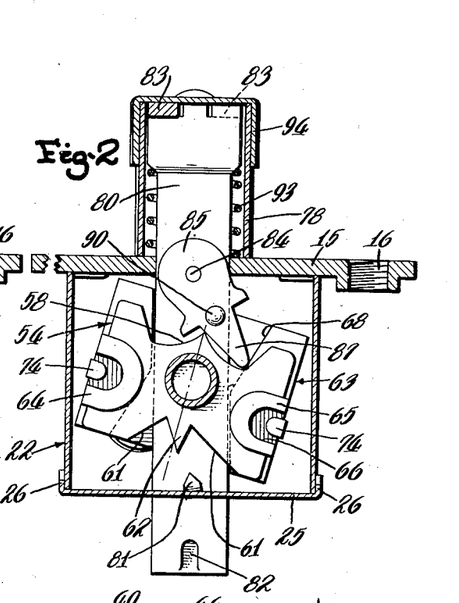
Figure 2 is a sectional view similar to Figure 1, but showing the parts of the embodiment in a different relation.

An actuated member 54 is disposed within the housing 22, the actuated member 54 being generally oblong, and having a central tubular stud 55, here shown to be extruded from the actuated member 54, the stud being of a size to fit within the tubular bearing portion 28 formed in the front wall 23 of the housing 22, so that the member 54 may rotate about the stud 55. The transverse margins of the actuated member 54 are provided with recesses 56 and 57, and as here shown, the recess 56 is larger than the recess 57. The longitudinal margins of the actuated member 54 are also recessed, and as shown in Figure 6 the top surface is recessed to provide a generally inverted V-shaped cam surface 58, the extremities of the cam surface 58 merging with inwardly extending surfaces 59 leading from the longitudinal margins. The junction of the V-shaped cam surfaces 58 with each of the inwardly extending surfaces 59 is rather abrupt to form limiting portions 60 for the cam surfaces 58. The bottom longitudinal margin of the member 54 is also recessed, and as best shown in Figures 1, 2, and 6, the longitudinal margins have inwardly directed angular portions 61 extending to the margins of an outwardly projecting generally V-shaped projection 62, the apex of the projection being off-center with respect to the central axis (shown in dot-dash lines in Figure 2) of the actuated member 54, for a purpose later to appear.

Carried by the actuated member 54 is a block 63, adapted to carry a bridge means. The block 63 may be formed of suitable insulating material, and the surface adjacent the actuated member 54 is provided with extending lugs 64 and 65, these lugs being substantially the same shape and size as the recesses 56 and 57 respectively of the actuated member 54, and are offset with respect to the longitudinal axis of the carrier block 63, so that the block 63 and the actuated member 54 can be assembled in only one relation. Each of the lugs 64 and 65 is provided with a recessed portion 66, as best shown in Figure 6. The surface of the block 63, adjacent the actuated member 54, is provided with an undercut portion 67 extending transversely of the block 63, the portion 67 having angular defining margins as shown at 68. The surface opposite to that contacted by the actuated member 54 is recessed as shown at 69, various parts of the recess 69 being disposed agularly with respect to other parts of the recess 69, as shown in Figure 8, and extending centrally from this opposite surface of the block 63, is a cylindrical projection 70, here shown to be formed integral with the block 63. Arranged on opposite sides of the projection 70 are pairs of inwardly tapering recesses 71 and 72, each pair being spaced apart on opposite sides of the longitudinal axis of the block 63, the recesses 71 being spaced farther apart than the recesses 72.

Carried by the block 63 is a bridge member 73, which is generally oblong in shape, but is provided with recesses in its margins, the recesses being suitably placed so that the bridge member 73 will fit within the recess portion 69 in only one position, and when in position, the outer surface of the bridge member 73 will be substantially flush with the outer surface of the block 63. Each of the transverse margins of the bridge member 73 is provided with an angularly extending finger 74 which is adapted to have its extremity clinched over the bottom of the respective recess 66 formed in the lug portions 64 and 65 of the carrier block 63. Formed centrally of the bridge member 73 is an aperture 75 adapted to pass the projection 70 formed on the carrier block 63, and the bridge member 73 is further provided with pairs of inwardly pressed generally circular depressions 76 and 77 which correspond to the recesses 71 and 72 respectively formed in the carrier block 63, the depressions 76 and 77, when the bridge member 73 is assembled with the block 63, having portions thereof respectively disposed within the recesses 71 and 72, as best shown in Figure 4.

Adapted to extend upwardly from the plate 15 is a generally cylindrical tubular member 78, having ear portions 79 extending from the lower margin thereof, the ear portions being adapted to pass through the arcuate slots 19 formed in the plate 15, and the extremities of the ears 79 being clinchable over the under surface of the plate 15. An actuating member 80 is arranged to extend through the interior of the cylindrical member 78, and through the apertures 17 and 27, formed respectively in the plate 15 and the housing 22. The actuating member 80, spaced from its lower end, is provided with a struck-out finger 81 which is angularly disposed with respect to the longitudinal axis of the member 80, the finger 81 having an inverted V-shaped operating surface, the apex of which is generally in alignment with the longitudinal axis of the member 80. Adjacent the lower end of the actuating member 80, and spaced from the finger 81, is a second finger 82, also preferably struck-out from the member 80. At its upper end, the actuating member 80 is provided with integral oppositely extending shoulder portions 83, and a reduced ear intermediate the shoulder portions.

Intermediate the ends of the actuating member 80 is a pivot member 84, here shown to be extruded from the surface of the actuating member 80, and providing a pivot for a pawl 85. The pawl 85 is formed to have a rounded surface 86 and a tapering finger 87. The finger 87 is relatively narrow with respect to the rounded portion 86 to form shoulders 88, the shoulders 88 being somewhat wider than the rounded portion 86 and merging with the rounded portion 86 by means of curved surfaces 89. The finger 87, adjacent the shoulders 88, is provided with an extruded generally hemispherical protuberance 90, which is adapted to cooperate with a trough 91 formed in a generally oblong leaf spring 92, the leaf spring 92 being disposable in the extended chamber portion 29 of the housing 22. Disposed about the actuating member 80 is a helical coil spring 93, and secured to the upper end of the actuating member 80 is a cylindrical cap 94, provided with an aperture 95 in its closure wall, through which extends the ear formed intermediate the shoulder portions 83 of the actuating member 80, and the extremity of the ear is upset over the outer surface of the closure wall of the cap 94, the oppositely extending shoulder portions 83 of the actuating member 80 bearing against the inner surface of the closure wall of the cap 94.

Figure 3:
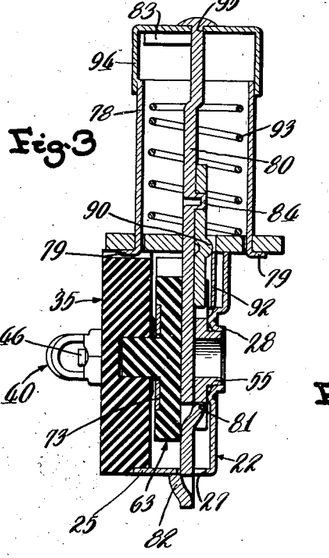
Figure 3 is a longitudinal sectional view corresponding substantially to the line 3—3 of Figure 1.

The parts of the electrical switching device shown in Figure 6 may be assembled in any desired relation, and when in assembled relation, as shown in Figures 1 through 5, the actuated member 54 has its tubular stud 55 journalled within the bearing portion 28, and the actuating member 80, carrying the pawl 85, is arranged so that a portion of the member 80 is disposed within the space provided by the undercut portion 67 of the actuated member 54, the angular defining margins 68 of the undercut portion 67 providing for movement of the oscillatable parts. The arcuate recess 18 in the slot 17 of the plate 15 provides clearance for the protuberance 90 formed in the pawl 85. The bridge carrying block 63 has its cylindrical projection 70 journalled within the recess 36 in the supporting member 35, and the supporting member 35 is secured to the casing 22 by clinching the fingers 32 and 34 of the extended portions 31 and 33, so that the extremities of the fingers lie in the undercut portions 50 and 52 in the outer surface of the supporting member 35. The extremities of the ears 30 of the housing 22 are clinched over the bottom of the recessed well portions 21 formed in the top surface of the plate 15, and the leaf spring 92 is disposed in proper position in the rectangularly spaced chamber portion 29. The ears 79 of the tubular member 78 project through the arcuate slots 19 and are bent to overlie the under surface of the plate 15, a recess being provided in the top margin (Figure 6) of the supporting member 35 to accommodate one of the clinched over ears 79, as best shown in Figure 3.

The finger 82, in some instances, may be bent to its position shown in Figure 3 after the parts are assembled, so as to be in line to engage the outer surface of the lower wall 25 of the housing 22. It is possible, however, to properly form the switch construction so that the finger 82 may be bent before the member 80 has been assembled with its related parts. As shown in Figures 1 and 3, the fingers 81 and 82 have been spaced so that the finger 82 engages the wall 25 to limit the outward movement of the actuating member 80 before the finger 81 reaches the innermost part of the notch provided by either one of the margins of the V-shaped projections 62 and the adjacent angular portion 61. By reason of this construction, substantially all strain is taken up by the finger 82. The finger 81, and the projection 62 formed on the actuated member 54, have been constructed and arranged so that the parts or switching mechanism cannot bind or stop on "dead-center". Therefore, the parts of the switching device are always in operative relation to be moved from one position of the switch to the other position.

Referring to Figure 5, it will be noticed that the contact means 40, for purposes of identification, have been lettered 40a, designating the contact on one side of the pivot, and 40b and 40c designating the contacts on the other side of the pivot, the contact 40a being in engagement with either one of the two depressions 77 in the various positions of the switch, the contact 40b being engageable with the top depression 76 (Figure 5) in one position of the switch, and the contact 40c being engageable with the lower depression 76 in the other position of the switch. Assuming that the parts of the switching device are in the position shown in Figures 1, 3, 4, and 5, the actuating mechanism 80, when depressed as by force applied by an operator, carries the pawl 85 toward the cam surface 58 formed on the actuated member 54, it being appreciated that the leaf spring 92 yieldably resists any swinging movement of the pawl 85 until the finger 87 of the pawl 85 engages the adjacent part of the cam surface 58, whereupon the pawl 85 will be moved about the pivot 84 until the extremity of the finger 87 is disposed adjacent the limiting portion 60 of the engaged part of the cam surface 58, whereupon further movement of the actuating member 80 will cause the actuated member 54 to swing about its pivot 55, and the carrier block 63 will swing about its pivot 70, this swinging movement causing a cam action between the protruding part of the contact head 44 of the contacts 40a and 40b, and the surfaces adjacent the engaged upper depressions 76 and 77 (Figure 5), so that the contacts 40a and 40b will be moved transversely of the supporting member 35 and against the urging force of the respective springs 48, and further movement of the actuated member 54 will register the lower depressions 76 and 77 (Figure 5) with the protruding part of the contact heads 44 of the contact means 40a and 40c respectively. When this registry has been effected, these protruding portions will snap into the recesses 76 and 77, thereby causing the switching operation to be performed with a generally snap action. After the switching operation, the pressure from the actuating member 80 is released, and the spring 93 urges the actuating member 80 to return to the normal position shown in Figure 1, the transverse margins of the slot 17 engaging the rounded portions 89 of the shoulders 88 of the pawl 85, and relative movement therebetween will cam the pawl to the original position shown in Figure 1, whereby the protuberance 90 of the pawl 85 will again be disposed within the trough 91 of the leaf spring 92. In this position the apex of the cam surface 58 is disposed on the other side of the longitudinal line of movement of the actuating member 80, and downward movement of the actuating member 80 will cause the finger of the pawl 85 to engage the other portion of the cam surface 58 to cause movement of the switch parts in an opposite direction. It will be appreciated that inward movement of the actuating member 80 will be limited by engagement between the free extremity of the tubular member 78 and the inner surface of the closure wall of the cap 94, as shown in Figure 2, while outward movement of the actuating member 80 is limited by engagement between the outwardly bent finger 82 and the outer surface of the lower wall 25 of the housing 22, the finger 81 and projection 62 being primarily for the purpose of preventing the switching parts from stopping on "dead-center".

Electrical conductors provided with plug terminals of the snap type, as shown at 96 in Figure 4, may be disposed within the apertures formed by the loop 42 of each of the contact means 40, the plug terminal 96 being held in place by the detent means 46. Referring to Figure 5, it will be obvious that in one position of the switching mechanism, the circuit will include the contact means 40a and the contact means 40b, as shown, and in the other position of the switch the circuit will include the contact means 40a and the contact means 40c.

Figure 9:
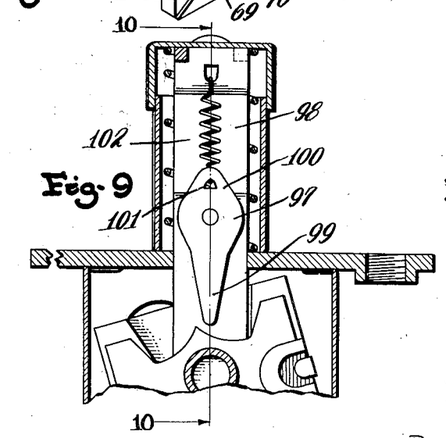
Figure 9 is a fragmentary longitudinal sectional view disclosing a different embodiment of my invention.
Figure 10:
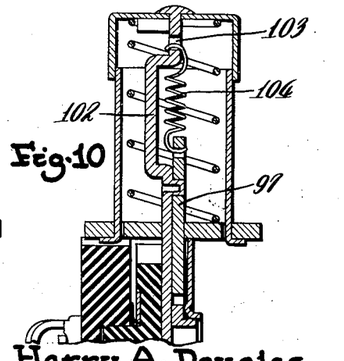
Figure 10 is a longitudinal sectional view corresponding substantially to the line 10—10 of Figure 9.

Referring to the embodiment of the invention shown in Figures 9 and 10, different means are provided to return the pawl to its normal operative position, and as here shown a pawl 97 is pivoted to an actuating member 98, the latter member being somewhat similar to the actuating member 80 hereinbefore described. The pawl 97, in this instance, is provided with an operating finger 99 on one side of the pivot, and an extending ear 100 on the other side of the pivot, the ear 100 being apertured as shown at 101. As best shown in Figure 10, the actuating member 98 is provided with an offset portion 102, and adjacent its upper extremity, the actuating member 98 is apertured as shown at 103, and a coil spring 104 has its ends respectively secured to the actuating member at the aperture 103, and to the pawl 97 at the aperture 101, the tension of the coil spring 104 normally urging the pawl 97 to the operative position shown in Figure 9. The pawl 97 may cooperate with an actuated member similar to the actuated member 54 hereinbefore described, and operation of the construction shown in Figures 9 and 10 in combination with the remainder of the switching mechanism will be substantially similar to that described in connection with the embodiment disclosed in Figures 1 through 8.

Figure 11:
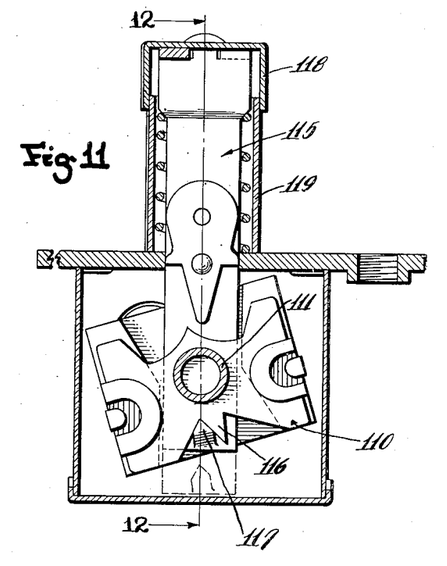
Figure 11 is a sectional view, similar to Figure 1, but showing a different embodiment of my invention.
Figure 12:
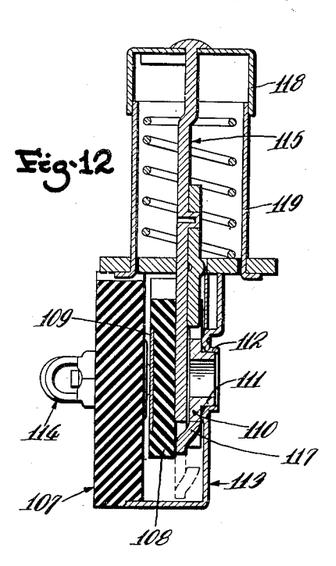
Figure 12 is a sectional view corresponding substantially to the line 12—12 of Figure 11.
Figure 13:
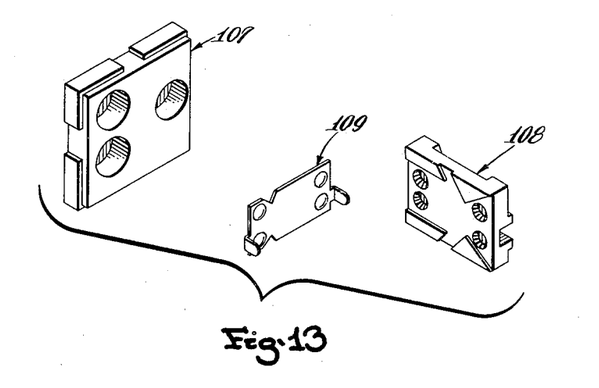
Figure 13 shows, in perspective, parts of the switch structure shown in Figures 11 and 12.
Figure 14:
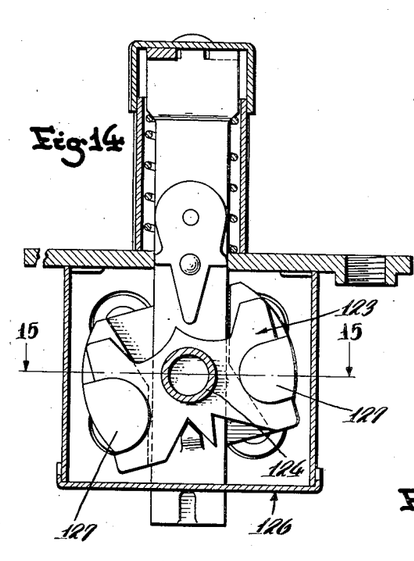
Figure 14 is a sectional view, similar to Figure 1, but showing still another embodiment of my invention.
Figure 15:
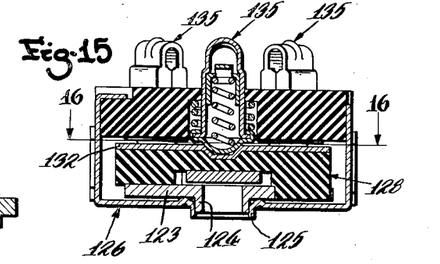
Figure 15 is a transverse sectional view corresponding substantially to the line 15—15 of Figure 14.

Referring to Figures 11 through 13, the embodiment of the invention therein disclosed comprises a switch structure in some respects similar to the structure shown in Figures 1 through 8. In this instance a supporting member 107, bridge carrying block 108, and bridge means 109 are provided, these parts being somewhat similar to the support 35, bridge carrying block 63, and bridge means 73. However, as best shown in Figures 12 and 13, the bridge carrying block 108 is not provided with a cylindrical projection, as is the case with the block 63 hereinbefore described. Therefore the bridge means 109, and the supporting member 107 are respectively formed without the aperture and recess necessary to accommodate such projection. As before, an actuated member 110, similar to the actuated member 54, forms part of the switch structure, the actuated member 110 being provided with a stud 111 adapted to be journalled in an extruded portion 112 formed, as before, on one wall of a housing 113, the housing 113 being similar to the housing 22 hereinbefore described. Contact means 114 are carried by the supporting member 107 in a manner similar to that described in the embodiment shown in Figures 1 through 8.

With the parts of the embodiment shown in Figures 11 through 13 assembled, and referring particularly to Figure 12, it will be noted that the bridge means 109, bridge carrying block 108, and actuated member 110 are all carried by the stud 111 which is journalled in the extruded portion 112 formed on the wall of the housing 113. The supporting member 107, carrying the contacts 114, is assembled with the housing 113, in a manner similar to that described in the embodiment of Figures 1 through 8, the urging force of the springs (not shown) surrounding each of the contacts 114, tending to maintain proper relation of the oscillatable parts with respect to each other, and with respect to the bearing 112 formed in the wall of the housing 113.

Oscillation of the parts of the switch are effected, as before, by an actuating member 115, similar to the actuating member 80, and in a manner hereinbefore described. The actuated member 110 is provided with a V-shaped projection 116, similar to the projection 62, and the actuating member 115 is provided with a struck-out finger 117 similar to the finger 81. However, in this embodiment, the lower wall of the housing 113 is not provided with an aperture, and the actuating member 115 and the housing 113 are proportioned so that the actuating member 115, in its lowermost position, stops short of engagement with the inner surface of the lower wall of the housing 113, as shown in dotted lines in Figures 11 and 12. In this instance, the projection 116 and the finger 117 are constructed and arranged to prevent "dead-center" stopping of the switch parts, and the finger 117, by reason of its engagement with surfaces of the actuated member 110 adjacent the projection 116, limits outward movement of the actuating member 115. As before, inward movement of the actuating member 115 is limited by abutment of the inner surface of the closure wall of a cap 118 with a tubular member 119, the parts 118 and 119 being similar to the cap 94 and tubular member 78, described in the embodiment shown in Figures 1 through 8. In some cases it might be desirable to limit inward movement of the actuating member 115 by abutment of the lower end of the actuating member 115 with the inner surface of the lower wall of the housing 113.

Referring to Figures 14 through 17, the embodiment of the invention therein disclosed comprises a switch structure quite similar to the structure shown in Figures 1 through 8, but in this instance a supporting member 120 is provided, having a central aperture 121, and a plurality of apertures 122 disposed about the aperture 121, the apertures 121 and 122 being configured similar to the apertures 37 hereinbefore described. An actuated member 123, similar to the actuated member 54 is formed with a stud 124, which is journalled in a bearing 125 in a wall of the housing 126, the housing 126 being similar to the housing 22. The transverse margins of the actuated member 123 are provided with recesses of unequal size, as before, the recesses being adapted to receive correspondingly configured bosses 127, formed on a bridge carrying block 128. On the surface opposite the bosses 127, the block 128 is provided with a fan-shaped slot 129, the surface intermediate the margins of the slot being provided with a centrally inwardly tapering recess 130, and a plurality of similar inwardly tapering recesses 131 are disposed about the recess 130, the number of recesses 131 corresponding to the number of apertures 122. A bridge means 132 is shaped to closely fit the defining margins of the slot 129, and is provided with a central depression 133, and a plurality of depressions 134 disposed about the depression 133, the depressions 133 and 134 being constructed and arranged to fit respectively within the recesses 130 and 131, when the bridge means 132 is assembled with the carrier block 128, in a manner best illustrated in Figure 15.

Figure 16:
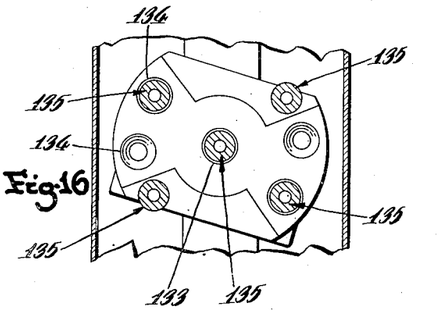
Figure 16 is a fragmentary sectional view corresponding substantially to the line 16—16 of Figure 15.

Carried in the recesses 121 and 122 of the supporting member 120, are a plurality of contact terminals 135, in a manner similar to that described in Figures 1 through 8, the contact carried by the central aperture 121 engaging with the centrally located recess 133 of the bridge means 132, and this contact is always in engagement with the bridge means 132, and provides in some respects a pivot axially in alignment with the pivot provided by the stud 124. In this particular instance four recesses 122 are provided to accommodate a like number of contact terminals 135, pairs of contacts 135 being disposed on opposite sides of the longitudinal axis of the support 120, as best shown in Figure 16, and the bridge means 132 is oscillated by means of mechanism similar to that described in Figures 1 through 8, to engage and bridge the contact terminals 135 which are diametrically disposed.

Figure 17:
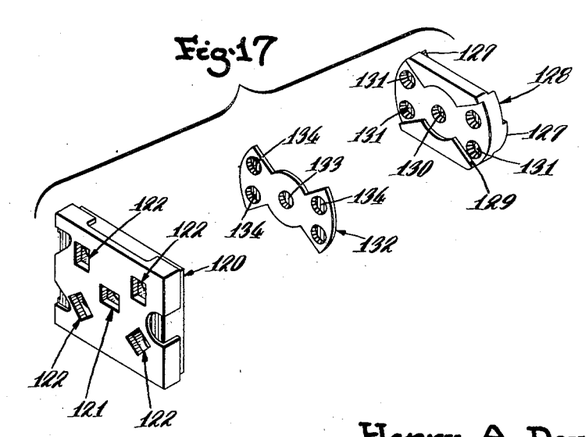
Figure 17 shows, in perspective, parts of the switch structure shown in Figures 14 through 16, and Figure 18 discloses an electrical circuit diagram.

As best shown in Figure 17 the lower apertures 122 are disposed at an angle with respect to the remaining apertures, so as to facilitate the insertion of plug conductor terminals, similar to the plug conductor terminal 96 hereinbefore described, in the loop portion of all of the contact terminals 135.

Figure 18:
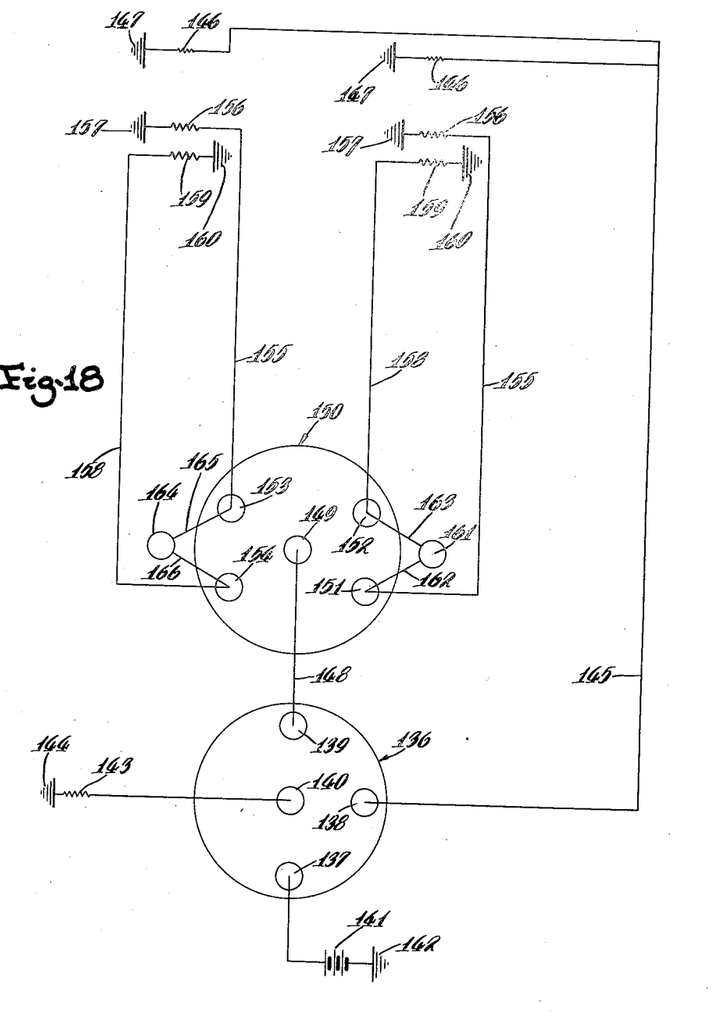

In Figure 18 is shown an electrical circuit diagram which may be used with the switches hereinbefore described. Referring particularly to this figure, an electric switch 136 is provided, this switch having contacts 137, 138, 139, and 140, and as here shown, the contact 140 is centrally located and the contacts 137, 138, and 139 are disposed radially about the contact 140. The contact 137 is connected to a source of current supply, such as a battery 141, and as is customary in the art, one terminal of the battery is connected to the contact 137, and the other terminal of the battery is grounded as shown at 142. The contact 140 is connected to one end of a resistance 143, which may be the filament of a tail lamp, the other end of the filament is grounded as shown at 144. The contact 138 is connected by a conductor 145 to one end of a pair of resistances 146, which may be the filaments of a pair of parking lamps, the other end of the resistances 146 being grounded as shown at 147. The contact 139 is connected by means of a conductor 148 to the center contact 149 of an electric switch 150.

The switch 150 may take the form shown in Figures 14 through 17, or the switch shown in Figures 1 through 8 or 11 through 13 may be used, it being appreciated that the switches would be constructed and arranged to perform the functions desired. As shown in Figure 18, the electric switch 150 has four contacts 151, 152, 153, and 154 spaced radially about the center contact 149, and suitable bridge means, such as the bridge means 132 hereinbefore referred to, may be used to continuously engage the contact 149 and selectively bridge either the contacts 151-153, or the contacts 152-154. The contacts 151 and 153 are connected by conductors 155 to one end of resistances 156, which may be the tilt or dim filaments of an automobile headlight, the other end of the resistances 156 being grounded as shown at 157. The contacts 152 and 154 are connected by conductors 158 to one end of resistances 159, which may be the bright filaments of an automobile headlamp, the other end of the resistances 159 being grounded as shown at 160.

A signalling device 161 is connected by means of conductors 162 and 163 to the contacts 151, 152 respectively, and a signalling device 164 is connected by means of conductors 165, 166 to the contacts 153, 154 respectively. The signalling devices 161 and 164 may take the form of electric lamps having low candle power and a high electrical resistance. In use with automotive vehicles, the signalling devices 161 and 164 would be desirably located so as to be conveniently visible to the operator of the vehicle.

With the parts electrically connected as described, a suitable bridge means (not shown) may be used to connect the contact 137 with the contact 140, to thereby energize the tail light filament 143 only. The bridge means may also be constructed and arranged to bridge the contacts 137, 138, and 140, so that the tail lamp 143 and the parking lamp filaments 146 are energized, and in another position, the bridge means may be arranged to bridge the contacts 137, 140, and 139, so that the tail lamp filament 143 is energized, and the center contact 149 of the switch 150 receives electrical energy. Assuming, now, that the bridge of the switch 150 engages the contacts 151 and 153, current will flow through the conductors 155, and through the tilt or dim filaments 156 to the ground, and the filaments 156 will be normally energized to provide light. Simultaneously, with the bridge means crossing the contacts 151 and 153, current will flow from the contact 151 through the conductor 162, the signalling device 161, the conductor 163, contact 152, conductor 158, and through the bright filament 159 to the ground, thus completing a circuit and energizing the signalling device 161, but the current flowing through the bridge filament 159 being insufficient to normally light this filament. At the same time current will flow from the contact 153 through the conductor 165, signalling device 164, conductor 166, contact 154, conductor 158, the bright filament 159 of the other lamp, and to the ground 160, completing a circuit and energizing the signalling device 161, and as before, the current flowing through the bright filament 159 being insufficient to normally light this filament. If one or the other of the bright filaments 159 were broken, or not properly connected, the signalling device in the circuit broken would not be energized, and therefore a warning would be given that the particular bright filament is not in working order.

When the bridge means engages the contacts 152–154, the conductors 158 carry current through the bright filaments 159 and to the ground 160, and the filaments 159 will be normally energized to provide light. With this arrangement of the bridge means, and referring to the contact 152, current is carried through the conductor 163, through the signalling device 161, the conductor 162, the contact 151, the conductor 155, through the tilt or dim filament 156, and to the ground 157, and the signalling device 161 will be energized, but the current flowing through the filament 156 will be insufficient to normally light this filament. Referring to the contact 154, current is carried through the conductor 166, the signalling device 164, the conductor 165, the contact 153, the conductor 155, the tilt or dim filament 156, and to the ground 157, and the signalling device 164 is energized, the current passing through the filament 156, as before, being insufficient to normally light this filament. Now, it will be obvious, that if either one of the tilt or dim filaments 156 should be broken, or improperly connected, the signalling device located in the circuit that is broken would be deenergized, and a warning would be given in this manner.

From the foregoing it will be obvious that when the bridge means of the switch 150 is connected to normally energize the tilt or dim filaments 156, the signalling devices 161 and 164 are respectively connected in a circuit with each of the bright filaments 159, these circuits being in parallel with the circuits including the dim filaments 156. Should either one of the bright filaments 159 become disconnected or broken, the signalling device in the particular circuit that is broken would immediately become deenergized, and thereby serve as a warning. On the other hand, if the bridge means of the switch means 150 is connected to normally energize the bright filaments 159, the signalling devices 161 and 164 are respectively connected in a circuit with each of the tilt filaments 156, these circuits being in parallel with the circuits including the bright filaments 159. Should either one of the filaments 156 become broken or disconnected, the signalling device in the particular circuit that is broken would become deenergized, and thereby serve as a warning. It will be obvious that signalling means such as that described may be suitably connected with the parking filaments 146 or the tail light filament 143, so as to indicate the condition of the parking or tail light filaments when the tilt or bright filaments 156 and 159 are energized.

It will be apparent to those skilled in the art that I have accomplished at least the principal object of my invention, and it also will be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that my invention is not limited thereto.

I claim:

1. Electric switching mechanism, comprising: supporting means; actuated means, bridge means secured to and movable with said actuated means relative to said supporting means in a plane generally parallel to the plane including said supporting means; contact means carried by and extending transversely from said supporting means, and adapted to be engaged by said bridge means; and generally rectilinearly movable means movable between said bridge means and said actuated means for effecting movement of said bridge means.

2. Electric switching mechanism, comprising: supporting means; actuated means; bridge means secured to and movable with said actuated means relative to said supporting means in the operation of said switch; contact means carried by said supporting means so that the axes of said contact means intersect a plane including the bridge means, and in certain positions of the switching mechanism said contact means are adapted to be engaged by said bridge means; and generally rectilinearly movable means movable between said bridge means and said actuated means for effecting movement of said bridge means.

3. Electric switching mechanism, comprising: supporting means; actuated means; oscillatable bridge means secured to and movable with said actuated means relative to said supporting means in a plane generally parallel to the plane including said supporting means; contact means carried by and extending transversely from said supporting means, and adapted to be engaged by said bridge means; and actuating means for effecting movement of said bridge means, said actuating means being confined between said bridge means and said actuated means for planar movement substantially parallel to the plane including the movement of said bridge means.

4. Electric switching mechanism, comprising: supporting means; actuated means; bridge means secured to and movable with said actuated means relative to said supporting means in the operation of said switch; contact means carried by said supporting means, in off-center relation, and adapted to be engaged by said bridge means, at least one of said contact means being in engagement with said bridge means in all operative positions of the switching mechanism, and the other contact means being selectively engageable with respect to said bridge means; and actuating means for effecting movement of said bridge means, said actuating means being confined to generally planar movement between said bridge means and said actuated means.

5. Electric switching mechanism, comprising: a casing; supporting means; actuated means; bridge means secured to and movable with said actuated means in a plane generally parallel to the plane including said supporting means;

spring-pressed contact means carried by said supporting means, and adapted to be engaged by said bridge means; actuating means, having planar movement parallel to the plane including the movement of said bridge means; means swingably mounted with respect to said actuating means and operable to engage said actuated means to effect movement of said bridge means, and said contact means being arranged to urge said actuated means into bearing relationship with said casing.

6. Electric switching mechanism, comprising: contact means; bridge means, movable relative to and adapted to engage said contact means; carrier means, for carrying said bridge means; actuated means, operatively connected to said carrier means for effecting movement of said bridge means, said actuated means and said carrier means having adjacent surfaces in spaced relation; and actuating means for effecting movement of said actuated means, said actuating means being movable within the spaced adjacent surfaces of said actuated means and said carrier means.

HARRY A. DOUGLAS.